2,773,904
PREPARATION OF ARALKYL KETONES

Robert M. Silverstein, Menlo Park, Calif., assignor to Purex Corporation, Ltd., South Gate, Calif., a corporation of California No Drawing. Application September 29, 1952, Serial No. 312,163

8 Claims. (Cl. 260—592)

This invention has to do with a new method for the preparation of aralkyl ketones, and particularly such ketones having molecular structures rendering them suitable as base stocks from which detergents may be prepared. More specifically, the invention is directed to the preparation of aralkyl ketones employing a Friedel and Crafts ketone synthesis which is unique in the use of glycerides as the acylating agent for direct condensation with an aromatic compound.

The present type of aralkyl ketones are useful for various purposes, especially as intermediates for other chemicals and products. For example, they may undergo reactions of the carbonyl group, and/or reactions of the aromatic residue, to give useful chemical compounds. Reduction of the carbonyl group followed by sulfonation of the aromatic portion, may be employed to produce aralkyl sulfonic acids which are effective detergents. When various possible amine groupings are introduced on the aromatic portion, the resulting amino ketones may possess surface active properties, insecticidal activity, or bactericidal and fungicidal properties.

The direct condensation of the glyceride with a suitable aromatic compound provides a relatively simple and economical method for preparing straight, long chain alkyl aryl ketones which heretofore could only be prepared by more involved and lengthy procedures. In essence, the invention is predicated upon the following reaction, assuming, for example, benzene to be used as the aromatic compound:

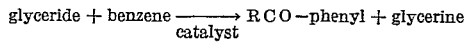

glyceride + benzene $\xrightarrow{\text{catalyst}}$ RCO—phenyl + glycerine

As indicated, the acylating reaction is accomplished by use of a Friedel and Crafts type catalyst, by which expression is meant a catalyst of the class consisting of aluminum chloride, ferric chloride, zinc chloride, stannic chloride, hydrogen fluoride, boron trifluoride, sulfuric acid, phosphorous pentoxide, and phosphoric acid. Of these, aluminum chloride is to be regarded as preferred.

The invention contemplates using any suitable glyceride or mixture thereof, although economically and for purposes of a detergent stock, it is advantageous to use a naturally occurring and preferably hydrogenated fatty glyceride having acyl radicals or chains containing from 8 to 18 carbon atoms. Such naturally occurring fatty acid glycerides may include those of palm oil acids, hydrogenated cottonseed oil acids, coconut oil acids, and hydrogenated tallow acids.

The aromatic component may include any of the various aromatic compounds which are recognized as being capable of undergoing the usual Friedel and Crafts ketone synthesis, and are characterized as having a replaceable nuclear hydrogen atom. Of such aromatic compounds, benzene, toluene, xylene and naphthalene are typical.

The invention affords the essential advantage that a material such as hydrogenated coconut oil may be condensed directly with e. g. benzene, to form commercial yields of an alkyl aryl ketone, which for use in the detergent field, may be hydrogenated to a straight chain alkyl benzene and then sulfonated to a detergent. The directness of the method is in contrast with the known methods for achieving a similar end result, by splitting the fat or oil to a fatty acid and glycerine, followed by conversion of the fatty acid to a fatty acid chloride with phosphorous trichloride, and final acylation of the aromatic by the acyl chloride to form an alkyl aryl ketone. In addition to its directness, the present method has the advantages of eliminating corrosion and handling problems that are occasioned by the preparation of acyl chlorides, and requiring lower initial investment in equipment.

In conducting the present synthesis, the glyceride, aromatic and catalyst are mixed and heated as on a steam bath, excluding all moisture. The aromatic is usually used in excess as the solvent, or a diluent such as carbon disulfide may be added. The reaction proceeds exothermally for a time, and can be completed by brief refluxing. For example, when aluminum chloride is used as the catalyst, the reactants may be kept within the general temperature range of about 40 to 80° C. After the reaction is complete, the mixture may be cooled and treated cautiously with ice and hydrochloric acid to decompose an aluminum chloride complex and to bring aluminum salts into the aqueous phase. The ketonic product is then recovered from the washed and dried organic layer. When hydrogen fluoride is used as the catalyst, the acylating agent and aromatic hydrocarbon are treated with a large excess of the catalyst and reacted at temperatures preferably in the range of 70 to 150° C. and at autogenous pressures. As to the quantity of catalyst used, it is preferred in the case of aluminum chloride to employ ratios of from slightly more than 2 mols of aluminum chloride to 1 equivalent of glyceride. In hydrogen fluoride condensations, the catalyst serves as the solvent medium and ratios of from 10 to 100 mols of the catalyst to 1 equivalent of glyceride, are preferred.

The following are given as typical examples of the preparation of aralkyl ketones in accordance with the invention, employing typically benzene, hydrogenated fatty glycerides, and aluminum chloride and hydrogen fluoride catalysts:

Example 1

The reaction mixture used consisted of the following:

43.4 g. (0.2 equiv.) hydrog. coconut oil
156 g. (2 mols) benzene
80 g. (0.6 mol) $AlCl_3$ The materials were combined, allowed to stand for one hour at room temperature, and then reacted for three hours on a steam bath at about 70 to 80° C. The reaction mass was cooled, drowned, and extracted with ether. The ether and most of the benzene was removed. The mass was saponified with alcoholic potassium hydroxide, neutralized, taken up in ether, and washed with water. After drying, the ether solution was saturated with ammonia to remove any free acids as the ammonium salts. After filtration, the material was distilled and a product collected at 115 to 170° C./1 mm. The fraction amounted to 36.8 g. or a 68.2% yield. A solid product, apparently mainly laurophenone, crystallized out of a methanol solution of this distillate.

The aqueous layer from the condensation reaction was neutralized with sodium carbonate and centrifuged. The precipitate was extracted twice with an alcohol-water mixture. The extracts and the water were evaporated and the salt residue was extracted with methanol. The alcohol and water were evaporated and the process repeated to give finally a thick syrupy liquid which, on heating with potassium bisulfate, gave off acrolein. About two grams of glycerine were recovered.

*Example II*

Hydrogenated acidless tallow oil was condensed with benzene in the presence of the catalyst in the following proportions:

57.2 g. (0.2 equiv.) hydrog. acidless tallow oil
156 g. (2.0 mols) benzene
56 g. (0.42 mol) $AlCl_3$ The reaction proceeded smoothly when the mixture was heated on a steam bath. After two hours, the reaction mass was worked up as described in Example I. Twenty-six grams of ketones and 23 g. of ammonium salts were obtained, giving a 39% yield. The aqueous layer was worked up and 1.3 g. glycerine were recovered (25% recovery based on glycerides entering the condensation reaction).

*Example III*

Edible coconut oil (0.215 equiv.), benzene (0.22 mol), and hydrogen fluoride (20.7 mols) were heated three hours in an enclosed bomb in a steam bath (the maximum temperature was approximately 80° C.). After evaporation of the hydrogen fluoride, the reaction mass was washed, dried, and distilled. An 18 g. fraction distilling at 108 to 216° C./1 mm. was collected. Analysis showed that the distillate contained 14 g. of acids, leaving 4 g. of ketones (7% yield). The 2,4-dinitrophenylhydrazone of the mass was prepared and a solid crystallized from methanol. After two recrystallizations, it melted at 99 to 100° C. (A known sample of laurophenone-2,4-dinitrophenylhydrazone melted at 99 to 100° C.)

I claim:

1. The method of producing aralkyl ketones, that includes condensing a fatty glyceride directly with an aromatic hydrocarbon compound in the presence of a Friedel and Crafts type catalyst to form the aralkyl ketone, and separating the ketone as a material consisting essentially of the ketone from the reaction product mixture, said aromatic compound being of the group consisting of benzene, toluene, xylene, and naphthalene.

2. The method of producing aralkyl ketones, that includes condensing a fatty glyceride directly with an aromatic hydrocarbon compound in the presence of a Friedel and Crafts type catalyst to form the aralkyl ketone, and separately recovering the ketone and glycerine as a material consisting essentially of the ketone and glycerine from the reaction product mixture, said aromatic compound being of the group consisting of benzene, toluene, xylene, and naphthalene.

3. The method of producing aralkyl ketones, that includes condensing a fatty glyceride directly with an aromatic hydrocarbon compound in the presence of aluminum chloride to form the aralkyl ketone, and separating the ketone as a material consisting essentially of the ketone from the reaction product mixture, said aromatic compound being of the group consisting of benzene, toluene, xylene, and naphthalene.

4. The method of producing aralkyl ketones, that includes condensing a fatty glyceride having acyl radicals each containing 8 to 18 carbon atoms directly with an aromatic hydrocarbon compound in the presence of a Friedel and Crafts type catalyst to form the aralkyl ketone, and separating the ketone as a material consisting essentially of the ketone from the reaction product mixture, said aromatic compound being of the group consisting of benzene, toluene, xylene, and naphthalene.

5. The method defined in claim 4, in which the aromatic compound is benzene.

6. The method defined in claim 4, in which the catalyst is aluminum chloride.

7. The method defined in claim 4, in which the glyceride is hydrogenated prior to condensation with the aromatic compound.

8. The method of producing aralkyl ketones, that includes condensing a hydrogenated fatty glyceride having acyl radicals each containing from 8 to 18 carbon atoms directly with benzene in the presence of aluminum chloride catalyst to form the aralkyl ketone and glycerine, and separately recovering the ketone and glycerine as a material consisting essentially of the ketone and glycerine from the reaction product mixture.

References Cited in the file of this patent

UNITED STATES PATENTS

| | | |
|---|---|---|
| 2,077,068 | Ralston | Apr. 13, 1937 |
| 2,086,216 | De Groote | July 2, 1937 |
| 2,267,093 | Hall | Dec. 23, 1941 |
| 2,267,111 | Knowles | Dec. 23, 1941 |